(12) United States Patent
Walker

(10) Patent No.: US 7,621,225 B2
(45) Date of Patent: Nov. 24, 2009

(54) METHOD AND APPARATUS FOR TREATMENT OF WASTE

(75) Inventor: William C. Walker, Huntington Beach, CA (US); Karen Bertram, legal representative, Huntington Beach, CA (US)

(73) Assignee: International Environmental Solutions Corporation, Romoland, CA (US)

( * ) Notice: Subject to any disclaimer, the term of this patent is extended or adjusted under 35 U.S.C. 154(b) by 314 days.

(21) Appl. No.: 10/517,023

(22) PCT Filed: Jun. 26, 2002

(86) PCT No.: PCT/US02/20362

§ 371 (c)(1),
(2), (4) Date: Oct. 24, 2005

(87) PCT Pub. No.: WO2004/072548

PCT Pub. Date: Aug. 26, 2004

(65) Prior Publication Data

US 2006/0124040 A1    Jun. 15, 2006

(51) Int. Cl.
F23G 5/12    (2006.01)
(52) U.S. Cl. .......... 110/229; 110/110; 110/101 R; 110/322; 110/210
(58) Field of Classification Search .......... 110/219, 110/253, 255, 342, 346, 110, 101 R, 322, 110/246, 227, 226; 201/40; 202/117, 118, 202/131, 136
See application file for complete search history.

(56) References Cited

U.S. PATENT DOCUMENTS

| | | | |
|---|---|---|---|
| 2,886,122 A | 5/1959 | Lantz | 55/355 |
| 2,993,843 A | 7/1961 | Lantz | 202/119 |
| 3,020,212 A | 2/1962 | Lantz | 202/118 |
| 3,098,458 A | 7/1963 | Lantz, Jr. | 110/242 |
| 3,954,069 A | 5/1976 | Loekn | 110/8 |
| 4,084,521 A | 4/1978 | Herbold et al. | |
| 4,412,889 A * | 11/1983 | Oeck | 202/117 |
| 4,474,524 A * | 10/1984 | Kawakami et al. | 414/213 |
| 4,504,222 A | 3/1985 | Christian | 432/139 |
| 4,917,023 A | 4/1990 | Jones | 110/230 |
| 5,017,269 A * | 5/1991 | Loomans et al. | 201/25 |
| RE33,776 E | 12/1991 | Noland | 110/346 |
| 5,088,424 A | 2/1992 | Sardan et al. | 110/344 |
| 5,147,421 A * | 9/1992 | Yung | 95/189 |
| 5,372,077 A | 12/1994 | Yen et al. | 110/233 |
| 5,376,340 A | 12/1994 | Bayer et al. | 422/175 |
| 5,410,973 A | 5/1995 | Kunstler et al. | 110/246 |
| 5,411,714 A | 5/1995 | Wu et al. | |

(Continued)

FOREIGN PATENT DOCUMENTS

JP    10-153747    5/1998

(Continued)

*Primary Examiner*—Kenneth B Rinehart
(74) *Attorney, Agent, or Firm*—Fish & Associates, PC

(57) ABSTRACT

An apparatus for treating waste material that comprises four major cooperating subsystems, namely a pyrolytic converter (24), a two-stage thermal oxidizer (26), a steam generator (28) and a steam turbine (30) driven by steam generated by the steam generator. In operation, the pyrolytic converter is uniquely heated without any flame impinging on the reactor component and the waste material to be pyrolyzed is transported through the reaction chamber of the pyrolytic converter by a pair of longitudinally extending, side-by-side material transporting mechanisms (42, 43).

10 Claims, 14 Drawing Sheets

U.S. PATENT DOCUMENTS 5,921,763 A    7/1999  Martin .......................... 431/5

FOREIGN PATENT DOCUMENTS

| JP | 11-323346 | 11/1999 |
|----|-----------|---------|
| JP | 2000-016455 | 1/2000 |
| JP | 2001-208311 | 8/2001 |
| JP | 2002-064075 | 3/2002 |
| JP | 2003-261880 | 9/2003 |

* cited by examiner

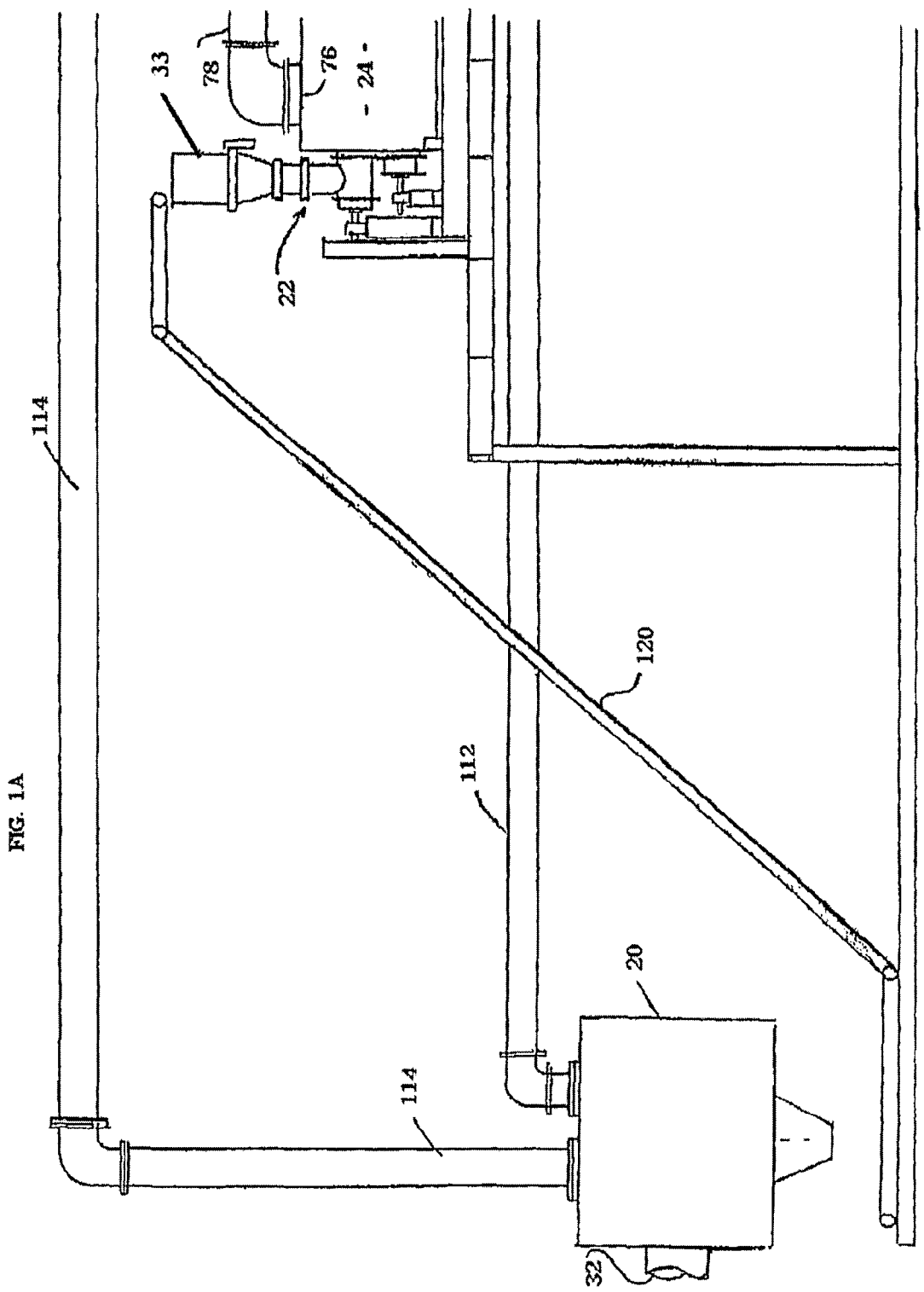

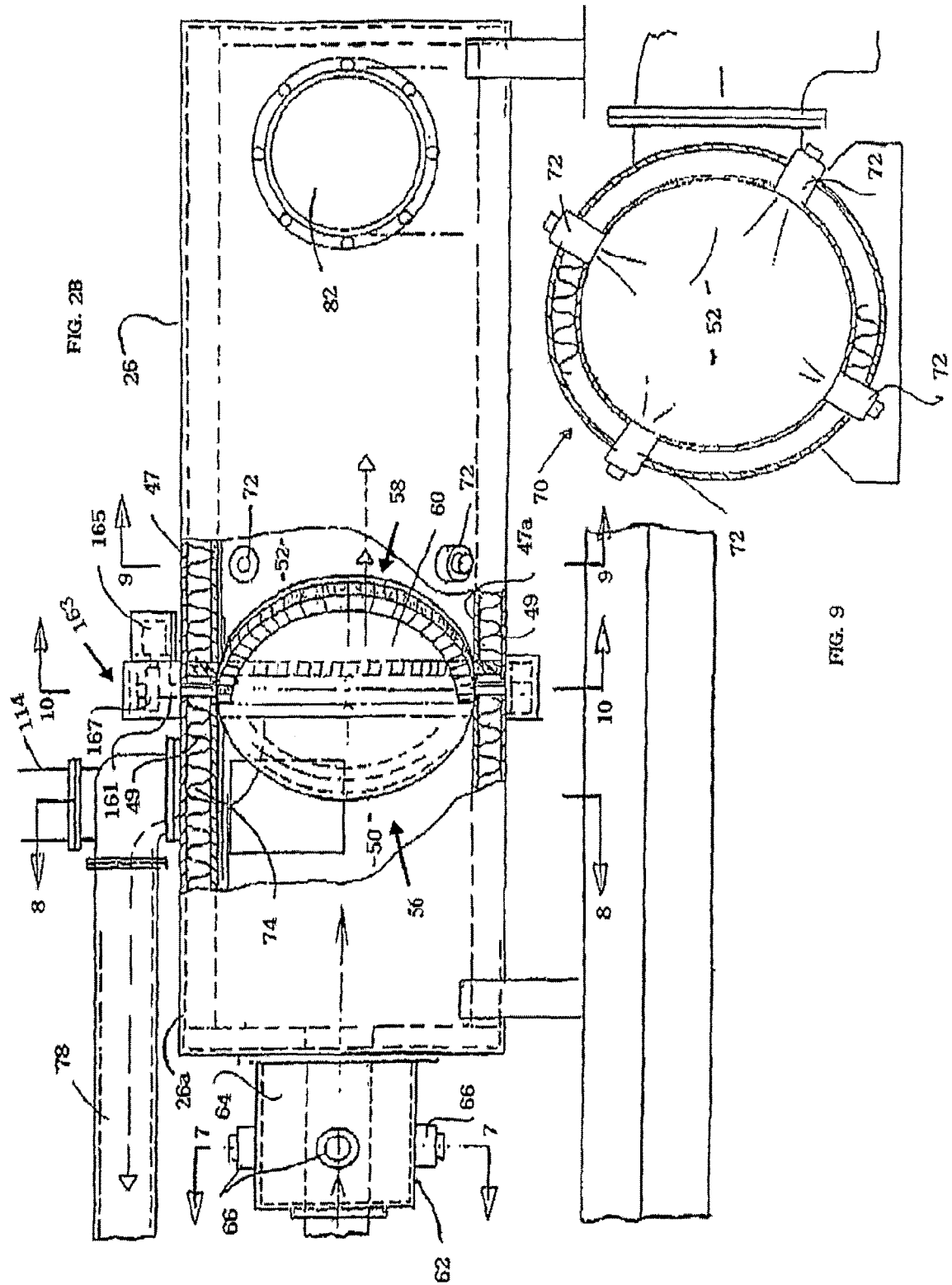

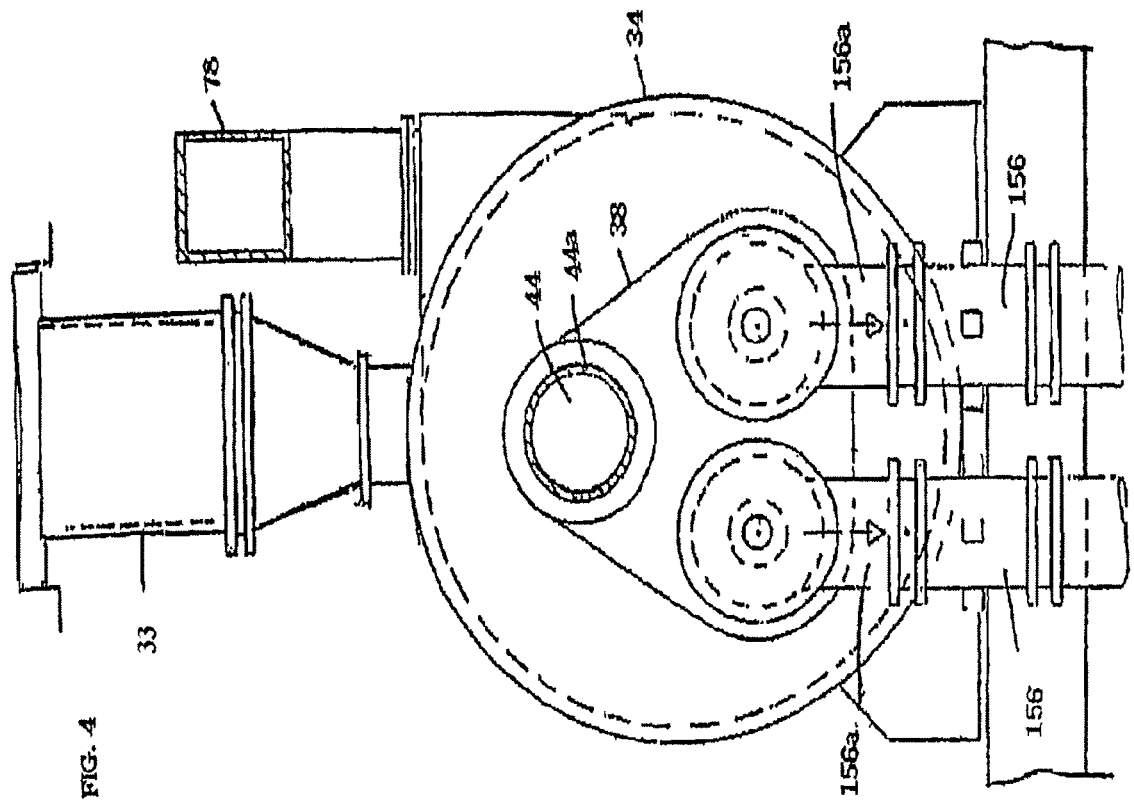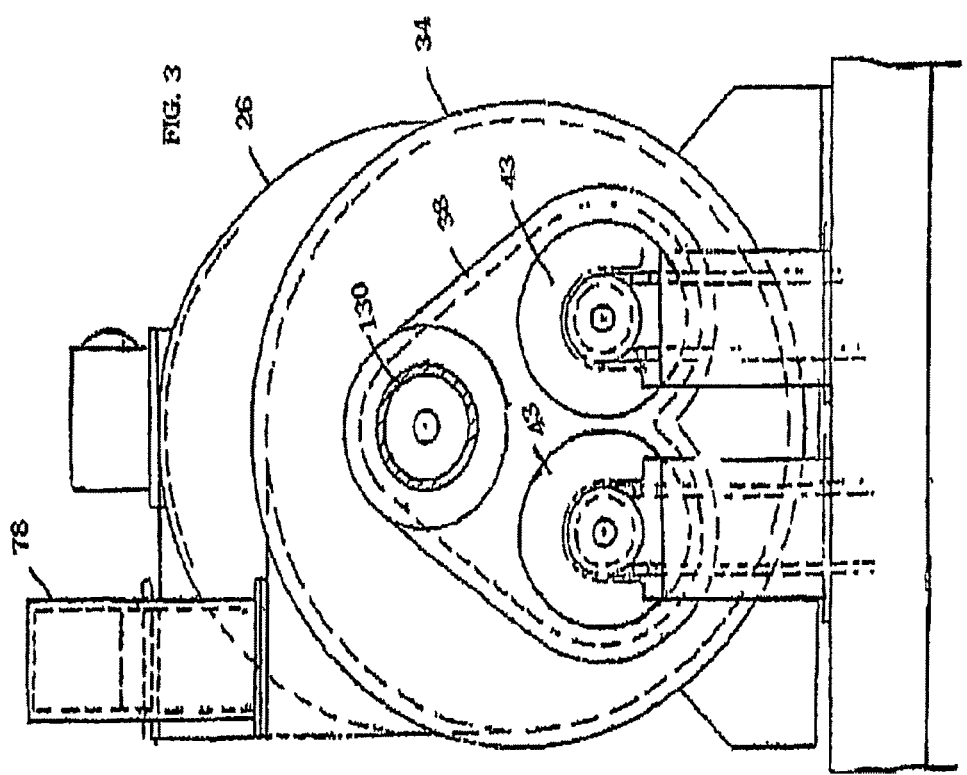

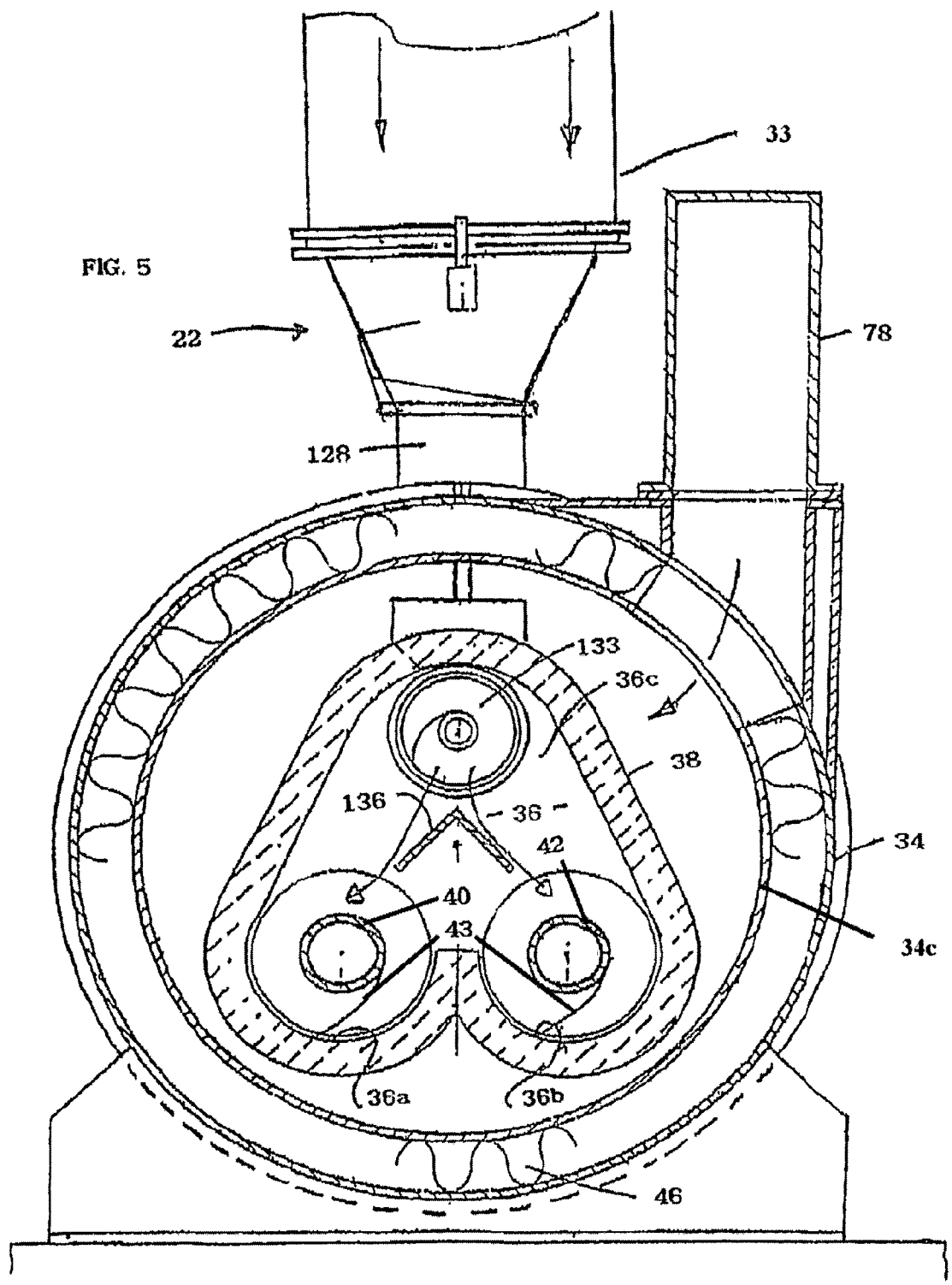

METHOD AND APPARATUS FOR TREATMENT OF WASTE

BACKGROUND OF THE INVENTION

1. Field of the Invention

The present invention relates generally to waste treatment systems. More particularly, the invention concerns waste treatment systems whereby the waste is processed by an apparatus comprising a thermal-chemical reaction chamber and a cooperating dual stage thermal oxidizer.

2. Discussion of the Prior Art

Disposal of waste materials, such as trash and garbage has become a serious concern of industrialized nations. Waste is troublesome not only because it represents something that, as a general rule, cannot be used for any beneficial purpose, but also because it presents hazards to the environment in terms of the space it takes up and the deleterious effects it has on living organisms. For a considerable period, the disadvantages inherent in waste were largely ignored or, at least afforded little weight when a new process or new product that would produce waste was introduced, the benefits to society that the process or product would bestow being considered paramount. Inevitably, however, the increasing volume of waste and the dangerous conditions presented by it forced more attention to be paid to ways of dealing with the material, such that planning for waste treatment often today is an important consideration in the design of a new process or product.

In general, refuse from community and from various types of industrial facilities vary widely in composition, and may include, for instance, sludge from sewage, garbage, plastic scraps, tires and other articles of rubber, scrap wood, oil impregnated rags and refuse oils, all of which are organic, as well as concrete debris and scrap metal. The inflammables among these components range widely in heat of combustion from about 1,200 kcal/kg up to about 7,000 kcal/kg. Consequently, it has been necessary to use a variety of types of disposal facilities for handling each type of material.

It has not been possible to treat all of these types of materials by ordinary combustion methods because offensive odors have been generated as a result of imperfect combustion, the production of components which are extremely corrosive, particularly at high temperature, adherence of fly-ash and the presence of substantial amounts of imperfectly combusted components in the residual ash. Disposal of ash also poses problems such as the scattering of ash dust by means of winds or fouling of water. Moreover, provision must be made for preventing corrosion and damage to the combustion equipment and instruments and to preventing pollution of the environment such as is caused by the gases resulting from the combustion of chlorinated organic materials. The increase in the quantity of scrap vinyl chloride resins is a factor here.

Conventionally, in the course of incineration, gasification is carried out by injecting air and steam prior to incineration. The objective is to convert organic materials from different sources into forms, which will burn uniformly in the manner of coal, wood or charcoal; however, refuse varies so widely in properties that the reaction velocity of gasification also varies strongly. Consequently, the difficulty in effecting complete combustion without harm to the environment has been such as to make the incineration operation uneconomical in many cases.

Presently, perhaps the most common method of waste disposal is the so called landfill method of disposal. However, because of the very large volume of waste that is generated on a daily basis particularly in highly populated areas, acceptable landfill sites are rapidly reaching capacity and new sites have become difficult to find. Accordingly, alternate methods of waste disposal, such as pyrolytic destruction of waste, have been actively considered.

By techniques of pyrolytic decomposition, many types of waste materials can be converted into energy rich fuels such as combustible gases and char, or fuel carbon. Accordingly, several types of devices for pyrolyzing refuse and other waste products have been suggested. Many of these devices have proved unworkable or economically unfeasible. Others, while feasible in concept have been proven to be inefficient and unreliable in continuous operation. Still others, while attractive in theory, have been shown to be too expensive to manufacture, install and operate.

Among the most successful prior art refuse conversion devices are the devices described in U.S. Pat. Nos. 2,886,122; 2,993,843; 3,020,212; and 3,098,458. The present invention constitutes an improvement upon certain of the devices described in these patents.

The pyrolytic process employs high temperature in, most desirably, an atmosphere substantially free of oxygen (for example, in a practical vacuum), to convert the solid organic components of waste to other states of matter, such pyrosylates in a liquid or vapor phase. The solid residue remaining after pyrolysis commonly is referred to as char, but this material may contain some inorganic components, such as metals, as well as carbon components, depending on the nature of the starting waste. The vaporized product of pyrolysis further can be treated by a process promoting oxidation, which "cleans" the vapors to eliminate oils and other particulate matter therefrom, allowing the resultant gases then to be safely released to the atmosphere.

A typical waste treatment system utilizing pyrolysis includes an input structure for introducing the waste; a chamber or retort from which air can be purged and in which pyrolysis processing occurs; and means for raising the temperature inside the chamber.

Systems that rely upon pyrolysis often are designed with principal attention being given to system efficiency. For example, to encourage consistent results from the pyrolytic conversion process, various methods and apparatuses commonly are used to pre-treat the waste before it is introduced into the pyrolytic chamber. These include pre-sorting or separating the waste into constituents on the basis of weight, shredding the material to make it of relatively uniform size and perhaps blending it with other pre-sorted material to promote even distribution of the waste as it is introduced into the retort. Several techniques have been employed to reduce the level of moisture in the waste before introducing it into the machine, because the presence of moisture makes the pyrolytic process less efficient. Such techniques include drying by desiccation or through the application of microwave energy.

Other features often are provided to continuously move waste through the treatment unit while the system is being operated, such as a form of conveyance arrangement. Screw conveyors or conveyor belts oriented at an incline have been used to ramp waste material, in units of a defined volume and at a defined rate of flow, up from a storage bin or pre-treatment assembly at the ground level to a charging hopper at the top of the treatment unit through which waste is metered into the pyrolytic chamber. Screw conveyors, auger screws and worm conveyors all have been used to impel waste through the retort while pyrolysis takes place, again, to encourage predictable results from the process.

The manner in which the retort chamber is supplied with heat energy to sustain pyrolysis also tan affect the efficiency with which the process can be carried out. For example, it has been found that uniform application of heat to the outer wall of the retort, through which it is conducted into the interior of the chamber, reduces the risk that the retort will buckle from uneven distribution of high temperatures and tends to encourage a more even distribution of heat and consistency of temperature throughout the chamber, which leads to consistent processing results. System features provided to address even heating have included those directed to the manner in which the primary source of heat energy, commonly fuel gases, being combusted in a heating chamber, is arranged with relation to the retort, and the number and placement of fuel gas injection ports, etc.

It further has been known to provide a feature which encourages the efficient use of heat to sustain the pyrolytic process, such as one that allows the recycling of gases that have once been combusted to supply heat energy to the pyrolytic chamber back through the gas injection port, where the gases can be ignited again with a fresh supply of oxygen or air.

Efficiency-promoting elements also can be provided for the processing and recycling of off-gases or vapor pyrosylate. For example, it is known that if a pressure gradient is maintained between the retort and the gas processing arrangement in the direction of the exhaust, the vapor pyrosylate naturally will tend to flow into the cleaning elements. To avoid wasting energy, the cleaned high temperature gases can be used to provide energy to some sort of generating station, such as to heat water in a boiler that supplies a steam generator.

What has long been needed and heretofore has been unavailable is an improved pyrolytic waste treatment system that is highly efficient, is easy to maintain, is safe, reliable and capable of operation with a wide variety of compositions of waste materials, is easy to maintain and one that can be constructed and installed at relatively low cost. The thrust of the present invention is to provide such an improved pyrolytic waste treatment system.

SUMMARY OF THE INVENTION

It is an object of the present invention to provide a pyrolytic waste treatment system that his highly versatile, is efficient and reliable in operation and one that is easy to maintain.

Another object of the invention to provide an improved method and apparatus for pyrolyzing waste material and recovering energy producing materials therefrom.

It is another object of the invention to provide a method and apparatus of the aforementioned character in which both liquid and solid waste materials can be processed simultaneously.

Another object of the invention to provide a method and apparatus of the aforementioned character in which waste materials are efficiently and inexpensively converted into energy rich fuels such as combustible gases and fuel carbon and in which useful chemical by-products are recovered.

Another object of the invention is to provide a method and apparatus for the complete combustion of mixed refuse without venting noxious or corrosive gases. Another object of the invention is to provide a method and apparatus of the aforementioned character which will enhance the overall heat efficiency of degradation while precluding pollution of the environment.

Another object of the invention is to provide an apparatus for treating waste material that comprises four major cooperating subsystems, namely a pyrolytic converter, a two stage thermal oxidizer, a steam generator and a steam turbine driven by steam generated by the steam generator.

Another object of the invention is to provide an apparatus of the character described in the preceding paragraph in which the pyrolytic converter is heated without any flame impinging on the reactor component.

Another object of the invention is to provide an apparatus of the class described in which the waste material to be pyrolyzed is transported through the reaction chamber of the pyrolytic converter by a pair of longitudinally extending, side-by-side material transfer mechanisms.

Another object of the invention is to provide an apparatus of the character described in the preceding paragraph in which each of the transfer mechanisms includes a first screw conveyor section made up of a plurality of helical flights for conveying the heavier waste and a second paddle conveyor section interconnected with the first section for conveying the partially pyrolyzed waste, the second section comprising a plurality of paddle flights.

Another object of the invention is to provide an apparatus as described in the preceding paragraph in which the dwell time of the waste material within the reaction chamber can be controlled independently of the feed mechanism that feeds waste material into the reaction chamber.

Another object of the invention is to provide an apparatus in which liquid feed material can be fed into the pyrolytic converter interiorly of the waste material transfer mechanisms.

Another object of the invention is to provide an apparatus of the class described in which the thermal oxidizer includes a first and second stages, the first stage a being used to initially heat the reactor component of the pyrolytic converter.

Another object of the invention to provide an apparatus as described in the preceding paragraphs which, once operating, is substantially self-sustaining and requires a minimum use of outside energy sources for pyrolyzing the waste materials.

It is still another object of the invention to provide an apparatus of the character described in which combustible gases generated within the reaction chamber are transferred to the thermal oxidizer and are mixed with air to produce a highly combustible gas which can be used to sustain the continued pyrolysis of the waste materials within the pyrolytic converter.

It is another object of the invention to provide an apparatus as described in the preceding paragraph in which excess heated gases are transferred from the second stage of the thermal oxidizer to a steam generating subsystem to generate steam for driving a turbine.

It is yet another object of the invention to provide an apparatus as described in the preceding paragraphs which is durable, efficient and highly reliable in operation.

Finally it is an object of the invention to provide an apparatus of the class described which is relatively inexpensive to manufacture, is simple to operate and one which can be operated on a substantially continuous basis with a minimum of problems and with little supervision.

These and other objects of the invention are realized by an apparatus and method for pyrolyzing waste materials comprising a pyrolytic converter having a uniquely configured, multi-chamber reactor and a two stage thermal oxidizer operably interconnected with the pyrolytic converter. During startup operations the reactor chamber of the pyrolytic converter is controllably heated by the first stage of the thermal oxidizer. Upon reaching an elevated temperature the materials to be treated are controllably fed into the reactor chamber where they are pyrolyzed. The combustible gases generated within the reaction chamber during the pyrolysis process are controllably transferred to the second stage of the thermal oxidizer wherein they are mixed with air. The gaseous mixture thus formed is transferred to the pyrolytic converter for combustion to maintain the reactor chamber at the required elevated temperature. During operation, the second stage of the thermal oxidizer is maintained at a pressure less than the pressure within the combustion chamber of the pyrolytic converter so that combustible gases within the combustion chamber will be continuously urged to flow toward the second stage of the thermal oxidizer. Heated gases are also transferred from the second stage of the thermal oxidizer to a steam generating subsystem for generating steam that can be used to drive a steam turbine.

BRIEF DESCRIPTION OF THE DRAWINGS

FIGS. 1A and 1B, when considered together, comprise a side-elevational view of one form of the apparatus of the invention.

FIGS. 2A and 2B, when considered together, comprise an enlarged, side elevational view of the thermo converter and thermo oxidizer components of the apparatus partly broken away to show internal construction.

FIG. 3 is an enlarged, cross-sectional view taken along the lines 3-3 of FIG. 2A.

FIG. 4 is an enlarged, cross-sectional view taken along lines 4-4 of FIG. 2A.

FIG. 5 is a greatly enlarged, cross-sectional view taken along lines 5-5 of FIG. 2A.

FIG. 9 is a cross-sectional view taken along lines 9-9 of FIG. 2B.

FIGS. 13A and 13B, when considered together, comprise a top plan view of components shown in FIGS. 2A and 2B.

DESCRIPTION OF THE INVENTION

Figure 1B:
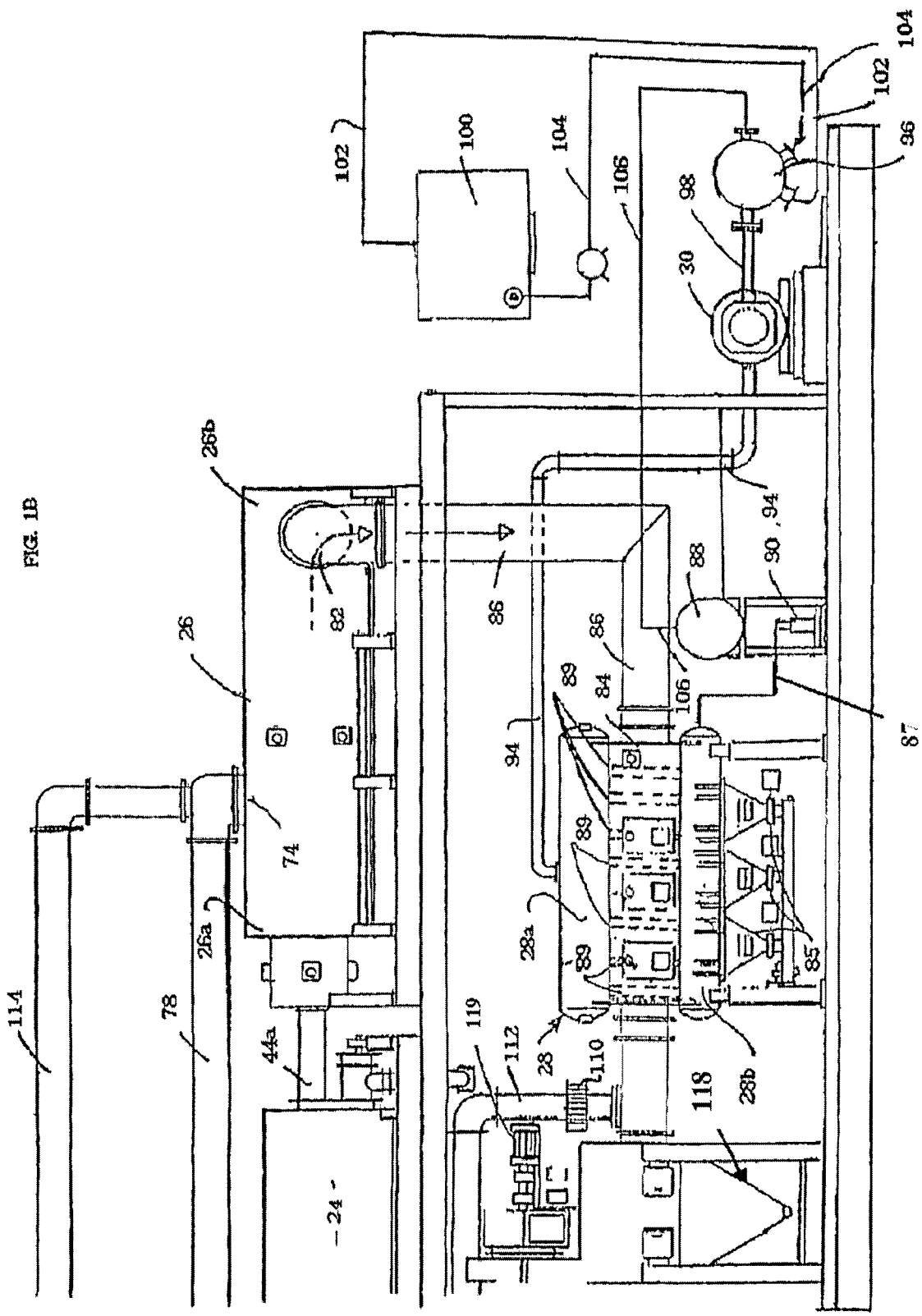

Referring to the drawings and particularly to FIGS. 1A and 1B, one form of the apparatus of the invention is there shown. The apparatus here comprises seven major cooperating subsystems, namely a dryer 20, a feed means 22, a thermal chemical reactor or pyrolytic converter 24, a two-stage, thermal oxidizer 26, a steam generator 28, and a steam turbine 30 that is driven by the steam converted by the steam generator.

In the operation of the apparatus of the invention, the waste material to be treated is first introduced into the dryer subsystem 20 via an inlet 32. After drying in a manner presently to be described, the dried waste material is controllably fed into the thermal reactor 24 by the novel feed means 22 which uniquely includes both a solid feed means and a liquid feed means. The solid feed means for feeding solid waste material to the converter comprises a gravity fed, bottom surge feed hopper 33 of the, general construction shown in FIG. 1C. As will be described more fully hereinafter, the liquid waste materials can be introduced into the pyrolytic converter simultaneously with the introduction of solid materials via the liquid feed means that is generally designated in FIG. 1C by the numeral 35. This novel liquid feed means includes an atomizer means for at least partially atomizing the liquid waste.

Figure 2A:
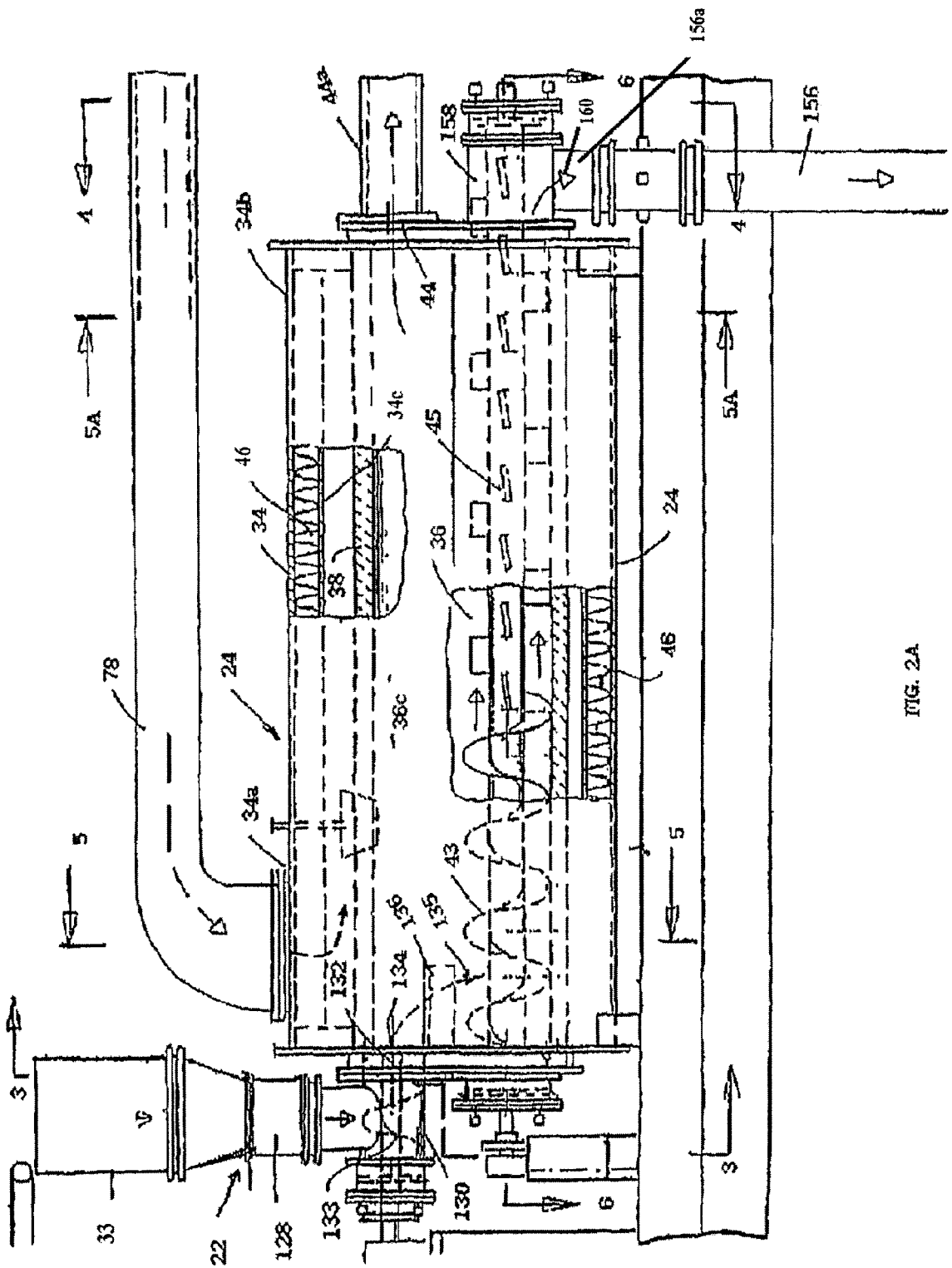
Figure 5A:
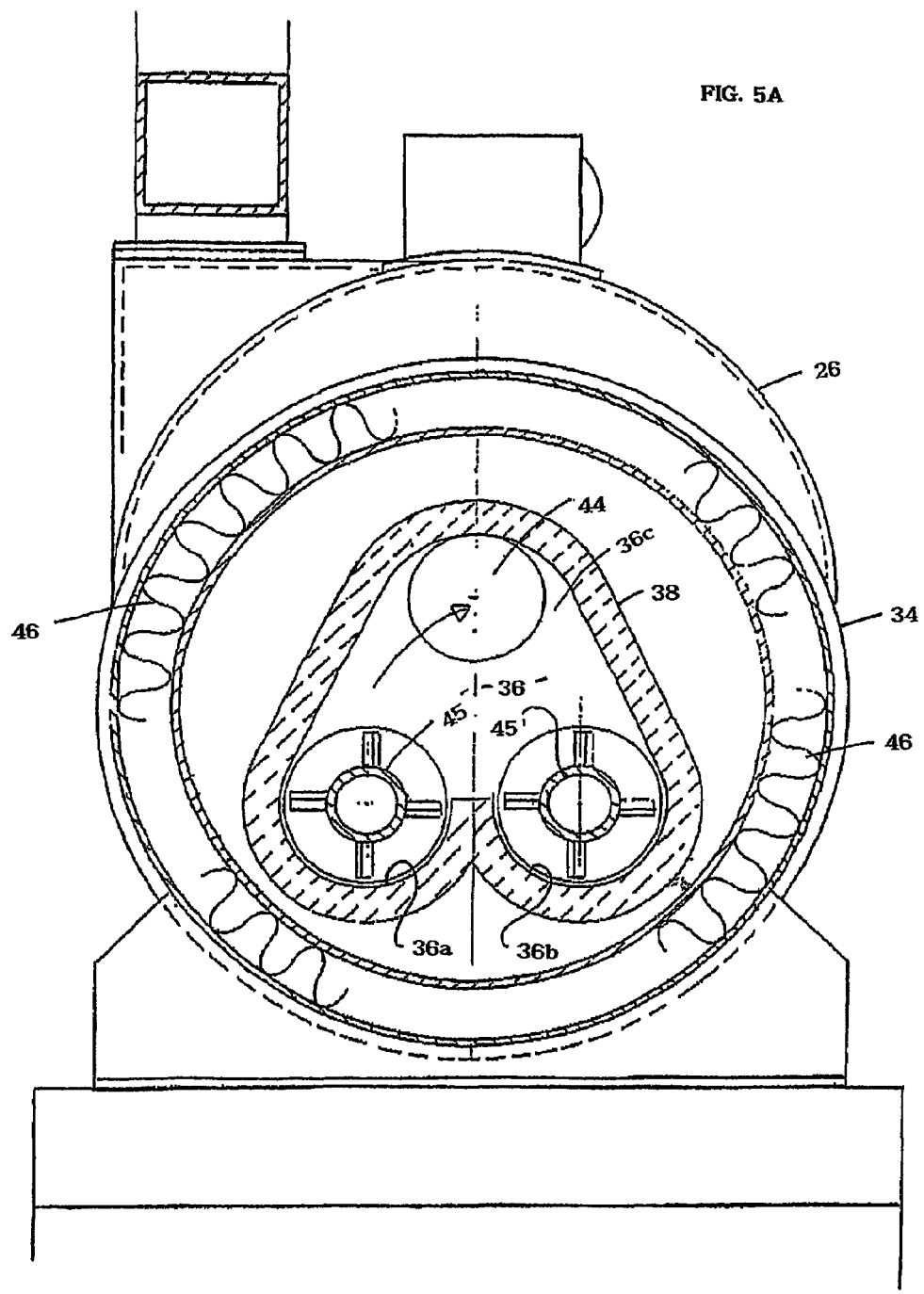
FIG. 5A is a greatly enlarged, cross-sectional view taken along lines 5A5A of FIG. 2A

As illustrated in FIGS. 2A, and 5, the novel thermal reactor or pyrolytic converter subsystem 24 of the present form of the invention is of a unique configuration that comprises a hollow housing 34 having first and second ends 34a and 34b. Disposed within housing 34 is a reaction chamber 36 that is defined by an elongated hollow structure 38 that in cross section has a novel three dome, generally triangular configuration (FIG. 5). Structure 38 is preferably constructed from a castable refractory material capable of withstanding temperatures in excess of 3200 degrees Fahrenheit. As shown in FIG. 5, chamber 36 includes first and second longitudinally extending, semicircular shaped, subchambers 36a and 36b. Extending longitudinally of chamber 36a is a first conveyor means, or conveyor mechanism 40. Extending longitudinally of chamber 36b is a similarly configured second conveyor means or conveyor mechanism 42. These conveyor mechanisms 40 and 42 are of a novel construction with each comprising a first helical screw section 43 for conveying less pyrolyzed and, therefore, more dense waste and a second paddle like section 45 for conveying the more pyrolyzed, less dense waste (see FIGS. 5 and 5A). The twin conveyor mechanisms are mounted within the reactor using conventional bearings 41 and are controllably rotated by conventional drive means 41a of the chamber shown in FIG. 6.

The upper portion 36c of reaction chamber 36 functions to permit generated gases within the chamber to expand and, in a manner presently to be described, to be transported from the reaction chamber via a chamber outlet 44 (FIG. 2A). As illustrated in FIGS. 2A and 5, the inner surfaces 34c of the hollow housing 34 within which the reactor chamber is mounted, are covered by a ceramic fiber insulation 46 that is connected to the inner walls of the housing by suitable fasteners. As will presently to be described, the area between the inner surfaces 34c of the housing and the ceramic reaction chamber 38, is initially controllably heated by the first stage of the thermal oxidizer 26.

Figure 12:
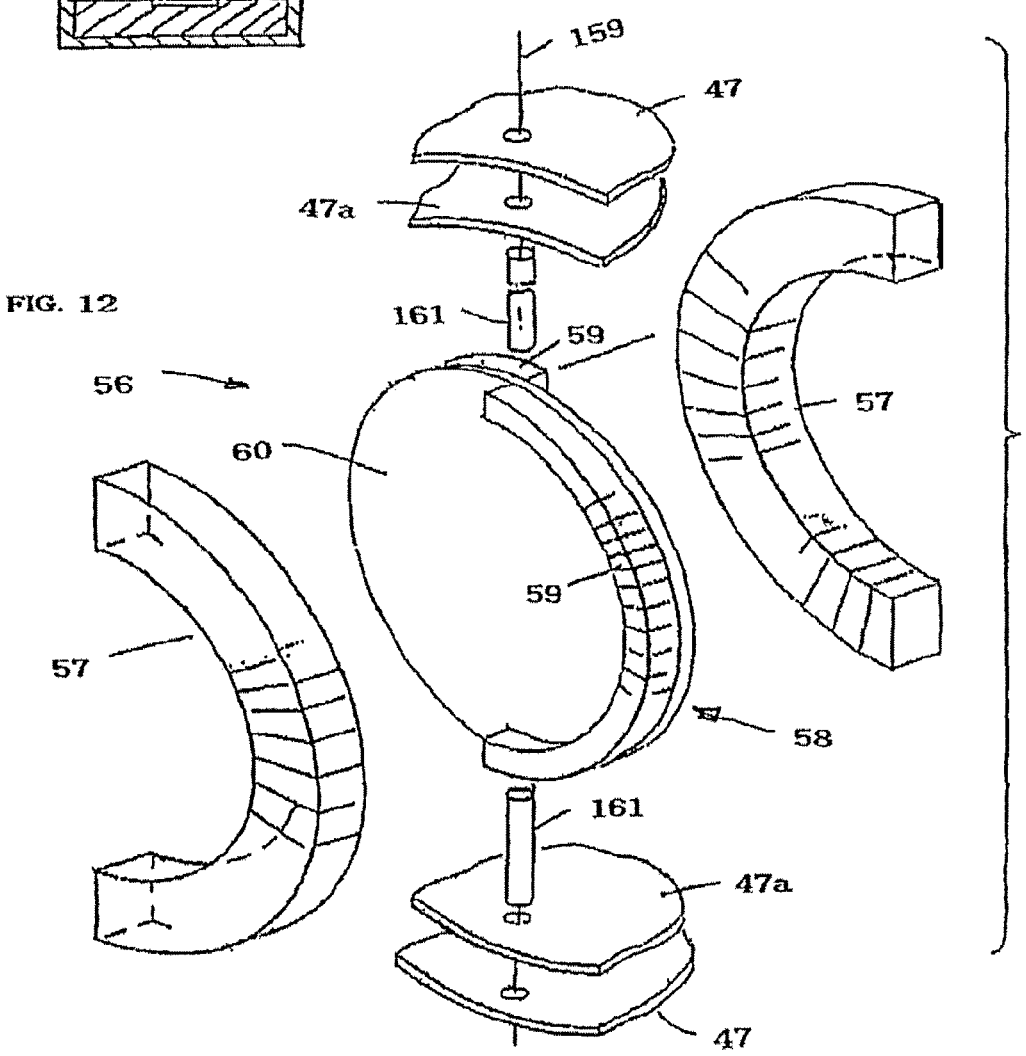
FIG. 12 is a generally perspective, exploded view of one form of barrier ring assembly of the thermo oxidizer.
Figure 13A:
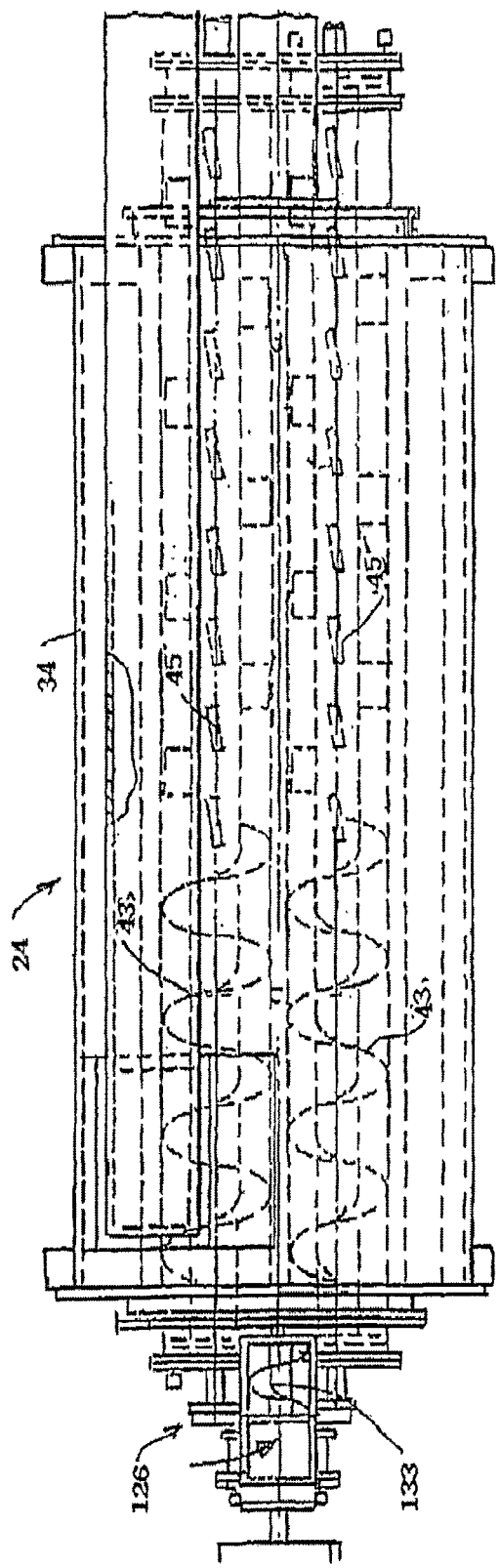
Figure 15:
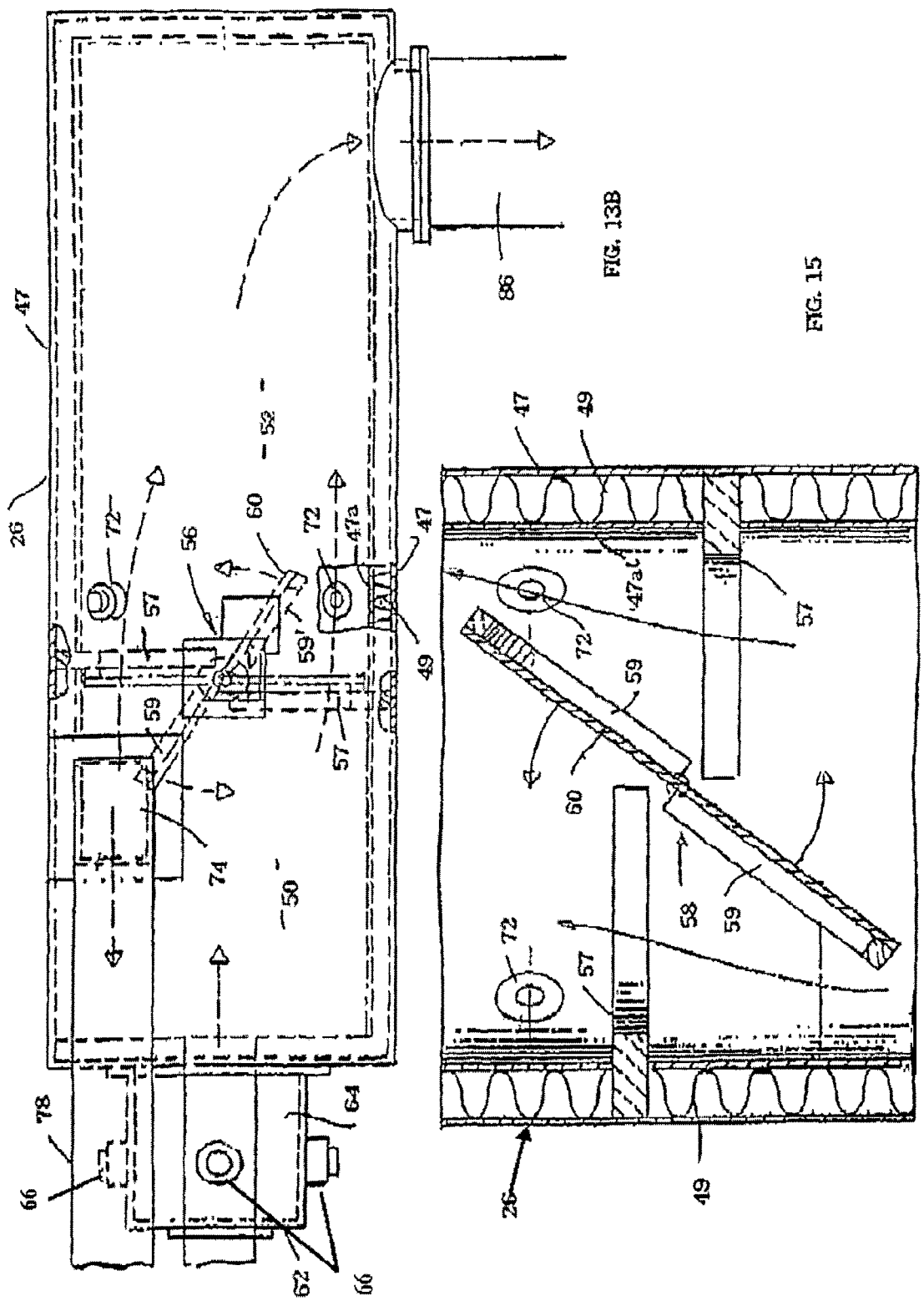
FIG. 15 is a fragmentary view similar to FIG. 14 but showing the barrier ring in an open position.

Turning particularly to FIGS. 2B, and 13B, the thermal oxidizer 26, of the present form of the invention, includes a hollow housing 47 having an inner wall 47a. Disposed between the inner and outer wall is a ceramic fiber insulation 49. Within housing 47 is a first stage defined by a first subchamber 50 and a second stage defined by a second subchamber 52. Dividing subchambers 50 and 52 is a novel baffle means for controlling the flow of gases between the chambers. This baffle means here comprises a novel barrier ring assembly 56 that comprises a pair of fixedly mounted semicircular segments 57 (FIGS. 10, 12, 13B, and 15) and a pivotally mounted assembly 58. Assembly 58 is made up of a pair of semicircular segments 59 that are affixed to a ceramic baffle plate 60 (see FIGS. 10, 12, 13B, and 15). As illustrated in FIGS. 12, 13B and 15, the baffle ring assembly 56 is movable between the first and second positions illustrated by the solid and phantom lines in FIG. 13B. Thermal oxidizer 26 is also is also capable of withstanding temperatures in excess of 3000 degrees Fahrenheit.

Figure 7:
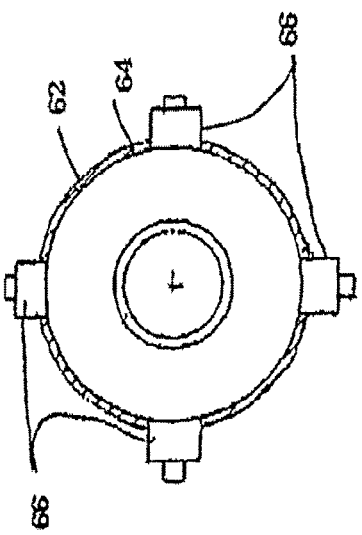
FIG. 7 is a cross-sectional view taken along lines 7-7 of FIG. 2B.

Thermal oxidizer 26 further includes a first stage heater means for controllably heating subchamber 50 and second stage heater means for controllably heating subchamber 52. In the present form of the invention, the first stage heater means comprises a first burner assembly 62 that includes a generally cylindrically shaped housing 64 (FIG. 7) that is connected to the first end 26a of thermal oxidizer 26 in the manner best seen in FIG. 2B. Housing 64 carries four circumferentially spaced gas burners 66 that are of conventional construction and function to initially heat subchamber 50 at time of startup. Similarly, the second stage heater means here comprises a second burner assembly 70 that is mounted in housing 47 intermediate subchambers 50 and 52 in the manner shown in FIG. 2B. As best seen in FIG. 9, second burner assembly 70 comprises four circumferentially spaced gas burners 72 that are also of conventional construction and function to initially heat second subchamber 52 at the time of startup. Burners 66 and 72 are of a conventional construction and are commercially available from sources such as Eclipse Combustion, Inc. of Rockford, Ill., U.S.A.

First subchamber 50 has an outlet port 74 that is in communication with a port 76 formed in reactor 24 via a conduit 78 (FIGS. 1A and 1B). In a manner presently to be described, reaction chamber 36, which preferably operates at less than five percent (5%) oxygen is initially heated in a flame-free manner by heated gases transferred from subchambers 50 and 52 of the thermal oxidizer to the area between the inner surfaces 34c of the housing 34 and the ceramic reaction chamber 38.

Second subchamber 52 of the thermal oxidizer has an outlet port 82 that communicates with an inlet port 84 of the steam generator subsystem 28 via a conduit 86. Steam generator subsystem 28, which includes a high pressure steam tank 28a and a lower mud drum 28b, is of a conventional design and is readily commercially available from various sources as, for example, Babcock Wilcox of Mississippi. Drum 28b is provided with a plurality of cleanout assemblies 85 for periodically removing sludge and the like from the drum. As shown in FIG. 1B, drum 28b is interconnected with tank 28a by a plurality of spaced-apart, connector tubes 89 and is also connected with a water supply here provided in the form of make-up water tank 88. The water contained within tank 88 is pumped to drum 28b via conduit 87 by a conventional pumping system 90 (FIG. 1B) and is converted to high-pressure steam within the connector tubes 89 which are impinged upon by the heated gases transferred from the thermal oxidizer 26 to the steam generator via conduit 86.

In system operation, the high pressure steam contained within tank 28a is transferred to steam turbine 30 via a conduit 94. Steam turbine 30, which is of conventional construction and is also readily commercially available from sources such as De Mag La-Vale, generates electricity that may be used to power the various electrically driven components of the apparatus, such as the pumping system 90. The steam exhausted from steam turbine 30 is carried to a conventional condenser 96 via a conduit 98. The water formed in condenser 96 is then transferred to a cooling tower 100, which is also of conventional construction, via a conduit 102. The water that has been cooled within the cooling tower 100 is returned to condenser 96 via a conduit 104 and is then transferred to tank 88 via a conduit 106 (FIG. 1B).

As shown in FIGS. 1A and 1B, a portion of the waste gases flowing through steam generator 28 is first cooled with dilution air and is then transferred to the dryer subsystem 20 via a diverter valve 110 and a conduit 112. These hot waste gases at a temperature of about 550 degrees Fahrenheit are used to efficiently dry the waste contained within the dryer 20. From dryer 20 the gases are returned to the thermal oxidizer via an overhead conduit 114 (FIG. 1B). The portion of the gases from the steam generator that are not diverted to the dryer are transferred to a condensed scrubber apparatus 118 which effectively removes harmful contaminants from the exhaust gases so that the gases can be safely discharged to atmosphere via a conventional blower unit 119. Scrubber apparatus 118 is commercially available from various sources such as C. W. Cole Fabricators, Inc. of Long Beach, Calif. Similarly, blower unit 119 is readily available from sources such as New York Blowers Co. of Willow Brook, Ill.

In operating the apparatus of the invention, the baffle assembly 56 of the thermo oxidizer 26 is moved into a closed position wherein chamber 50 is substantially sealed relative to chamber 52. This done, burners 72 of burner assembly 70 are ignited to controllably heat chamber 52 to a temperature sufficient to cause the water contained within tubes 89 of the steam generator apparatus 28 to be converted into high-pressure steam. When tank 28 of the steam generating system is filled with pressurized steam, the steam can be conveyed to the turbine generator 30 via conduit 94. With the generator 30 in operation, sufficient electricity can be generated to operate the various electrical components of the apparatus including the pumping system 90 which is used to pump water to the make-up tank 88.

Once sufficient power is being generated by generator 30 to operate the electrical system, burners 66 of burner assembly 62 can be ignited in order to controllably heat chamber 50. When the gases within chamber 50 reach a temperature sufficient to pyrolyze the waste material that is contained within dryer 20, the material can be transferred to the feed means by transfer means shown here as a conventional waste conveyor 120. As previously mentioned, the material within dryer 20 is dried by the excess gases flowing from the thermal oxidizer through the steam generator and into conduit 112 via diverter valve 110. Once the gases within chamber 50 have reached the pyrolyzing temperature, they are transferred to the reactor chamber via conduit 78, to heat the reactor chamber to a pyrolyzing temperature. When this has been achieved, baffle assembly 56 can be moved into the open position shown in FIG. 2B and the feeding of the dried waste can begin.

Figure 1C:
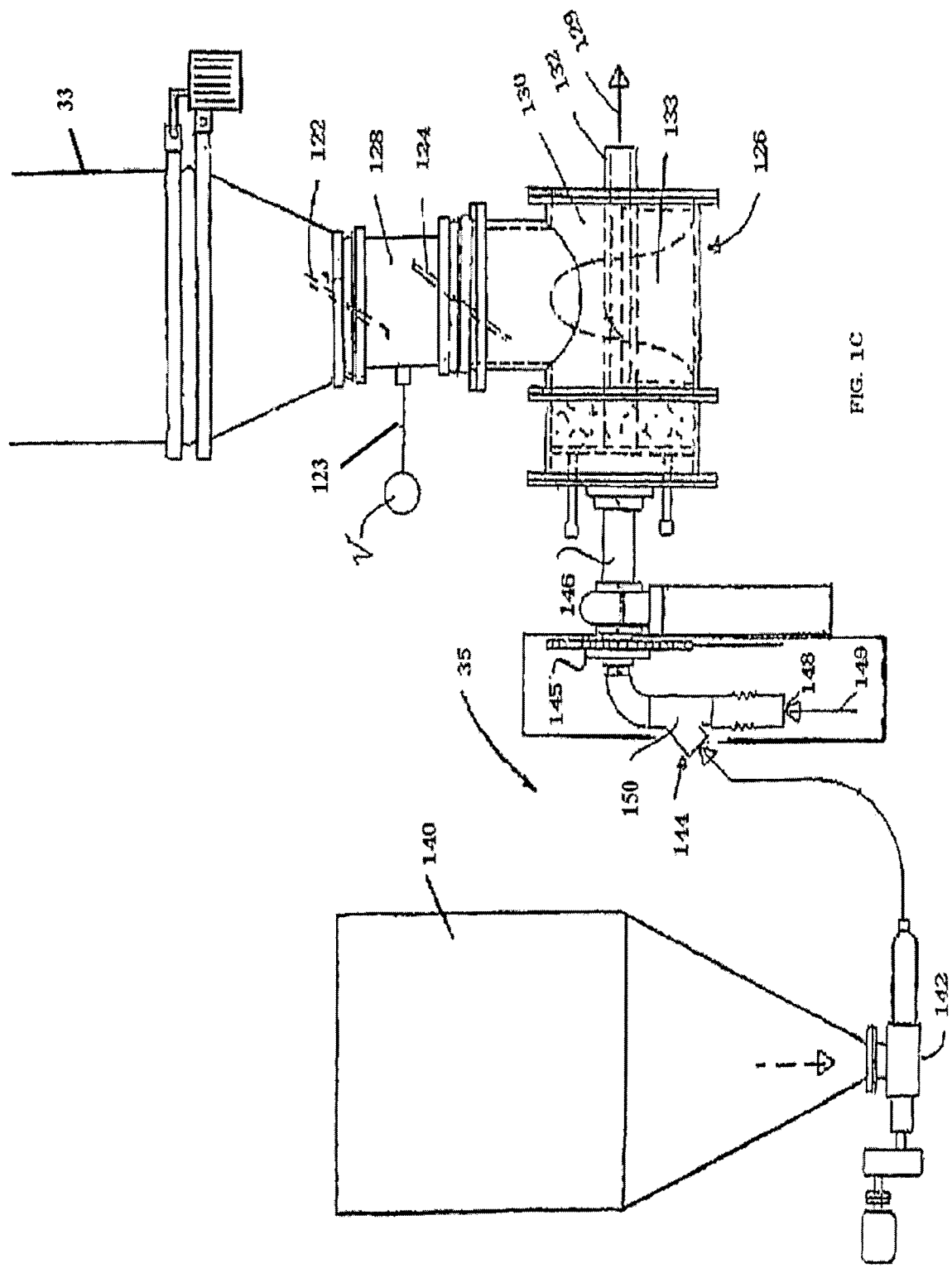
FIG. 1C is an enlarged, side-elevational view of the feed means of the invention.

As the waste material, being transferred to the hopper by waste conveyor 120, starts to flow into the hopper 34, the upper butterfly valve 122 of the hopper system is moved into the open position shown in FIG. 1C of the drawings and the lower butterfly valve 124 is moved into a closed position blocking any transfer of waste material from the hopper into the auger portion 126 of the feed assembly. Once intermediate chamber 128 of the feed assembly is filled with the waste to be pyrolyzed, a vacuum is drawn within chamber 128 by a vacuum pump "V" that is interconnected with chamber 128 by a conduit 123 (FIG. 1C). After chamber 128 has been suitably evacuated, butterfly 124 is moved into an open position permitting the waste contained within chamber 128 to flow into the auger conveyor means of the feed assembly without jeopardizing the integrity of the vacuum within the reactor chamber. As is indicated by the arrow 129 in FIG. 1C, the dried waste material entering the chamber 130 that contains the conveyor screw 133 is controllably fed into the reactor chamber via hollow shaft 132 and inlet 134 of the reactor chamber (FIG. 2A).

The waste material entering the, reactor chamber will fall downwardly in the direction of the arrow 135 of FIG. 2A in a direction toward the screw conveyors 43. As illustrated in FIG. 5, the waste material flowing into chamber 36 will impinge upon the elongated, angular shaped distribution member 136 that is disposed within chamber 36 (see also FIG. 2A). As the waste being introduced into the reactor impinges on diverter member 136, the waste will be directed toward the two twin conveyors 40 and 42 in the direction of the arrows of FIG. 5. It is to be understood that with the construction just described, waste materials can be controllably metered into the reactor chamber 36 and evenly distributed between the two screw conveyors 40 and 42.

The waste material introduced into chamber 36 in the manner just described will be carried forwardly of the reactor by the conveyer mechanisms 40 and 42 and, as it travels forwardly of the reactor will be undergo pyrolyziation due to the elevated temperature of the reactor chamber. By the time the waste material reaches the end of the screw conveyor, sections 43, it will have been substantially reduced to carbon form which is of a lesser density that will permit it to be transferred through the remaining length of the reactor chamber by the novel paddle conveyors 45 that are of a construction best seen in FIG. 5A.

Turning once again to FIG. 1C, it is to be noted that the apparatus of the invention further includes a fluid waste tank 140 that is adapted to store fluid waste as, for example, waste oil. Because of the novel construction of the feed means of the invention, the waste fluid can be disposed of simultaneously with the disposal of the solid waste. When it is desired to dispose of the fluid waste contained within tank 140, a conventional pumping means 142, which is shown here as a conventional, progressive, cavity, positive displacement pump 142, is used to transfer the fluid from vessel 140 to the atomizing means of the apparatus. This novel atomizing means here comprises the assembly generally designated in FIG. 1C by the numeral 144. In the present form of the invention, the atomizing means comprises a chicksan rotating joint 145 that permits the introduction of various carrier gases such as steam into the hollow shaft 146 of the feed means. The atomizing means further includes a steam inlet 148 through which steam at least 400 degrees Fahrenheit from steam generator 28 can be controllably introduced in the direction shown by the arrow 149 of FIG. 1C. Steam entering steam inlet 148 will create a venturi effect within a Y-fitting 150 that defines a venturi mixing chamber that is interconnected within a conduit 146 via the chicksan joint 145. The venturi effect created within fitting 150 will draw the fluid into the venturi chamber where it will be atomized in a manner well understood by those skilled in the art. The atomized fluid will then flow into the previously identified chamber 130 via hollow shaft 146. As the atomized fluid enters chamber 130, it will intermix with the waste material contained therein and will travel with the waste material into the reactor in the manner earlier described. It is, of course, apparent that the intermixture of the dried waste material and the atomized fluid will be readily pyrolyzed within the reactor as the material is carried forwardly of the reactor by the conveyor means of the invention.

Figure 6:
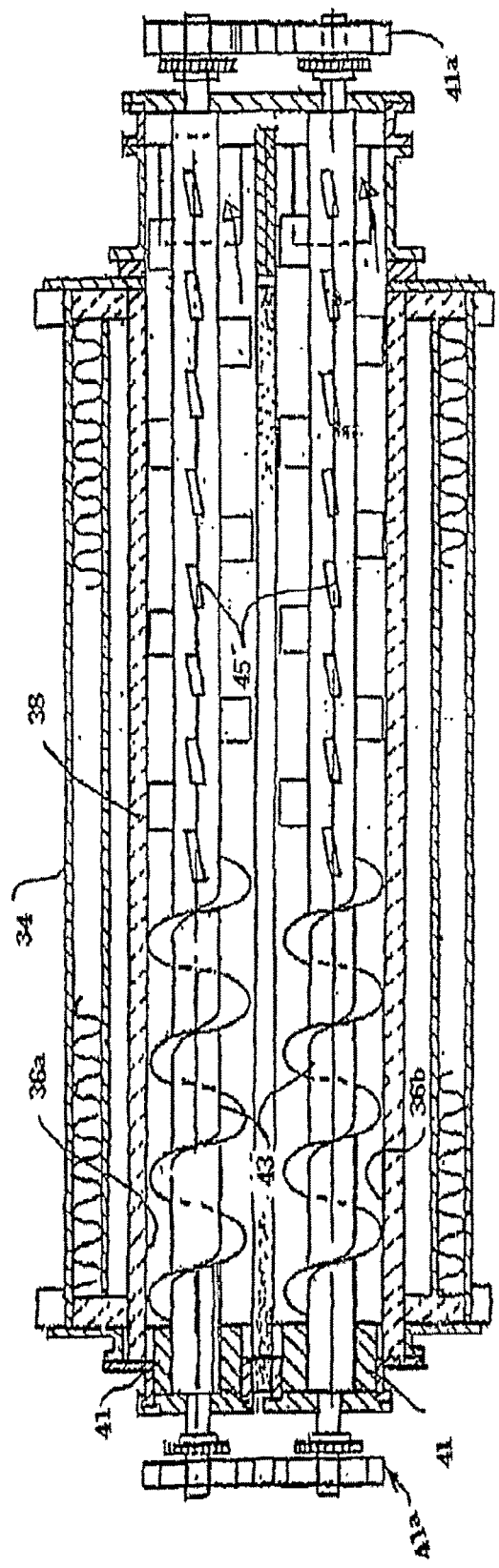
FIG. 6 is a cross-sectional view taken along lines 6-6 of FIG. 2A.
Figure 8:
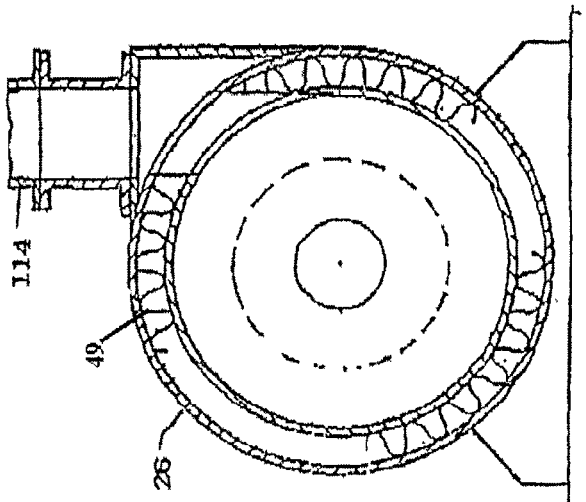
FIG. 8 is a cross-sectional view taken along lines 8-8 of FIG. 2B.

It is to be understood that the novel conveyor means of the invention that is mounted within the reactor chamber in the manner best seen in FIG. 6 is relatively light weight. In the prior art wherein the conveyor systems were made up of elongated, helically shaped, screw-type conveyors, the conveyor was of a substantial weight and, when only supported at each end experienced undesirable sagging proximate its center. With the novel construction of the present invention, wherein a large part of each of the screw conveyors comprise the much lighter weight paddle wheel-type construction, the overall weight of the conveyors is substantially reduced when compared to the prior art, single-piece helical screwtype conveyors. Additionally, since conveyors of the present invention are disposed in a side-by-side relationship, the overall length of the reactor can be substantially reduced from that which would be required if only a single helical type screw conveyor were to be used. In summary, because of the novel design of the conveyor systems of the present invention, undesirable sagging of the conveyors is prevented and, as a result of the twin conveyor design, the length of the reactor can be significantly reduced.

When the waste material reaches the second end 34b of the reactor, the pyrolized waste will be introduced via extensions 156a into a pair of side-by-side outlet conduits generally designated in FIG. 4 by the numeral 156 where the pyrolyzed waste products can be recovered. Extensions 156a are in communication with the chambers that house the conveyor means so that the waste carried by the conveyor means will be introduced into outlet conduits 156 in the manner indicated by the arrow 160 of FIG. 2A.

As previously mentioned, the heated gases produced by the pyrolytic reactor will be transferred to the thermal oxidizer 26 via outlet 44 and conduit 44a. A portion of the heated gases produced by the pryolysis of the waste material will be returned from the thermal oxidizer to the reactor to sustain the pyrolysis and a portion will be transferred via conduit 86 to the steam generator subsystem 28 via conduit 86. These later heated gases will function to heat the water contained within tubes 89 to convert it to high pressure steam which, in turn, will be used to drive turbine 30. It is important to note that to maintain the desired transfer of the heated gases, the baffle assembly 56 is strategically operated so as to continuously create a slight positive pressure within first stage 50. This positive pressure will urge a portion of the heated gases to be return to the reactor via conduit 78 to sustain the pyrolysis of the waste. To accomplish this strategic balance, the pressure differential between chambers 50 and 52 is continuously monitored by a differential pressure gauge and the position of the baffle assembly is precisely regulated by a baffle operating means shown in the drawings as comprising a control mechanism 163.

Figure 10:
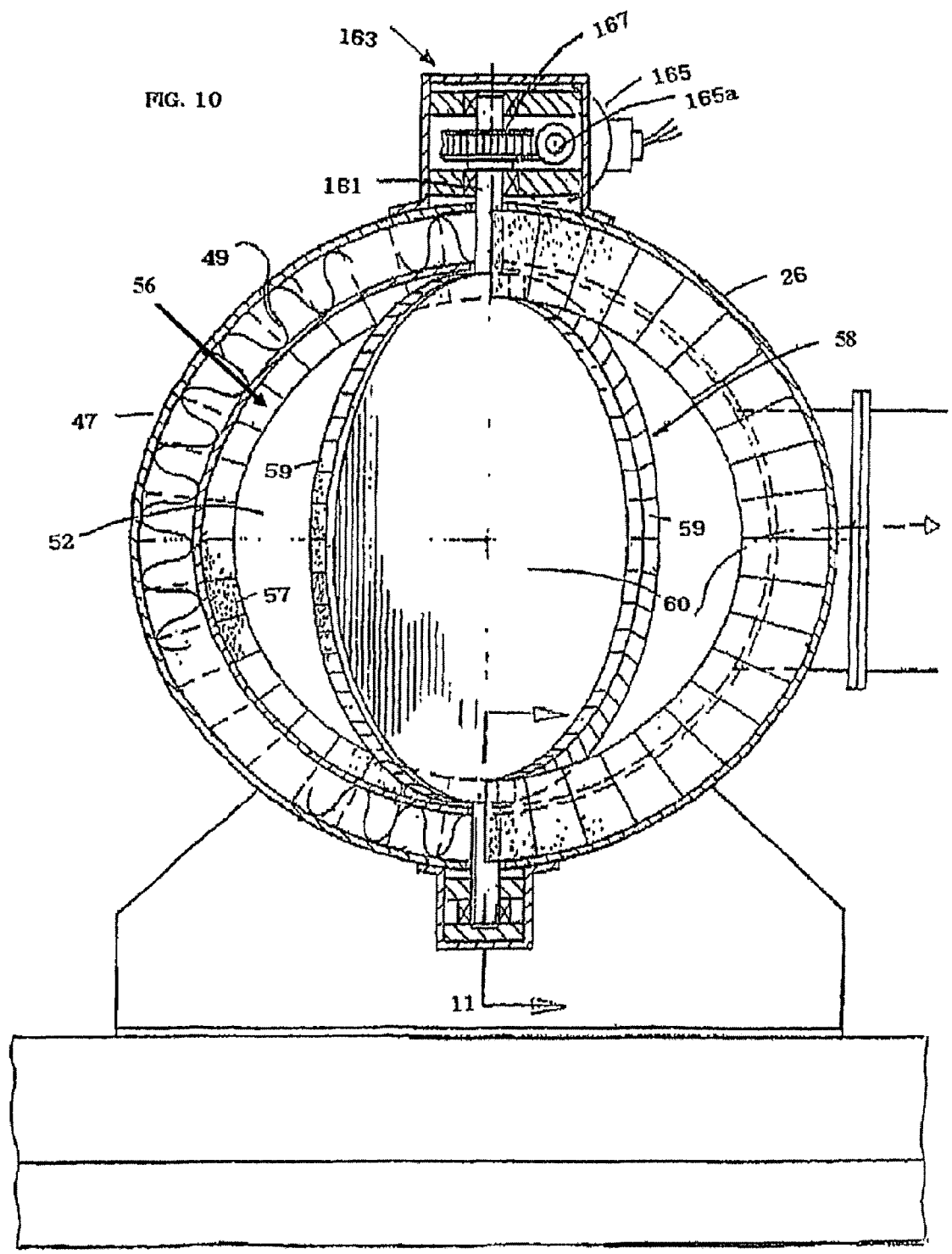
FIG. 10 is an enlarged, cross-sectional view taken along lines 10-10 of FIG. 2B.
Figure 11:
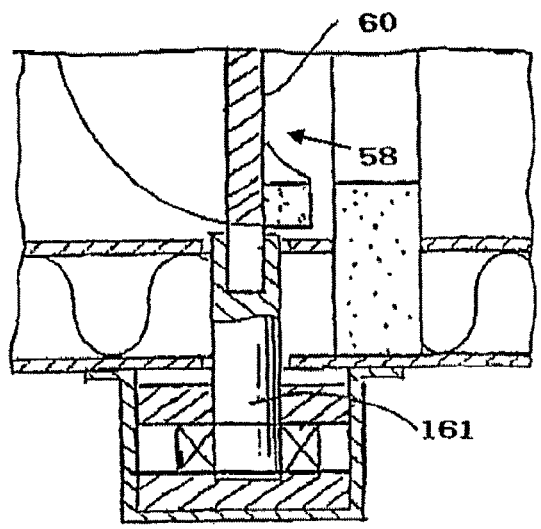
FIG. 11 is a cross-sectional view taken along lines 11-11 of FIG. 10.
Figure 14:
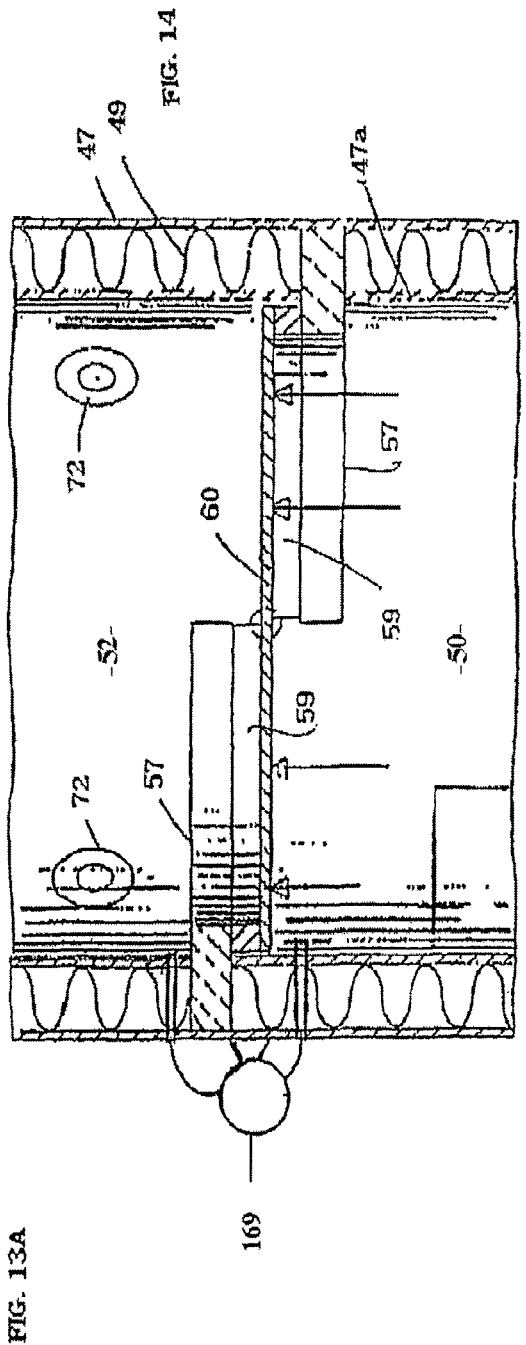
FIG. 14 is an enlarged, fragmentary view of a portion of the thermo oxidizer component showing the barrier ring in a closed position.

As best seen in FIGS. 11 and 12, the unique baffle assembly of the present invention comprises a generally circular-shaped ceramic plate 60 to which a pair of semicircular barrier rings are affixed in the manner illustrated in FIG. 12. The baffle assembly, which comprises plate 60 and the semicircular rings affixed to either side of the plate is mounted for pivotal movement within the thermal oxidizer about an axis 159 that is defined by a pair of spaced-apart pivot pins 161. Pivot pins 161 are mounted within the wall of the thermal oxidizer housing in the manner shown in FIG. 12 so that the baffle assembly can be pivoted about axis 159 by the control mechanism 163 from a first closed position to a second open position. As best seen in FIG. 10, the control mechanism here comprises a drive motor 165 having a drive shaft 165a that drives a toothed gear 167 that is drivably connected to upper pivot pin 161. As is schematically shown in FIG. 14, the differential pressure gauge 169 is in communication with both of the chambers 50 and 52 so that the pressure within the chambers can be continuously monitored. The differential pressure gauge is readily commercially available from several sources. However a gauge sold under the name and style MAGNEHELIC by Dwyer Instruments, Inc. of Anaheim, Calif. has proven satisfactory for the present purpose. In a manner well understood by those skilled in the art, gauge 169 is operably associated with drive motor 165 to appropriately operate the motor to open and close the baffle assembly in a manner to continuously maintain the desired pressure differ ential between chambers 50 and 52. As previously mentioned, when the pressure differential is properly controlled, the heated gases within chamber 50 will controllably flow into the thermal converter 24 to maintain the pyrolysis of the waste. Accordingly, during normal operation, no heat need be added to the system by the gas fired burners 66 and only a pilot flame need be maintained.

Figure 16:
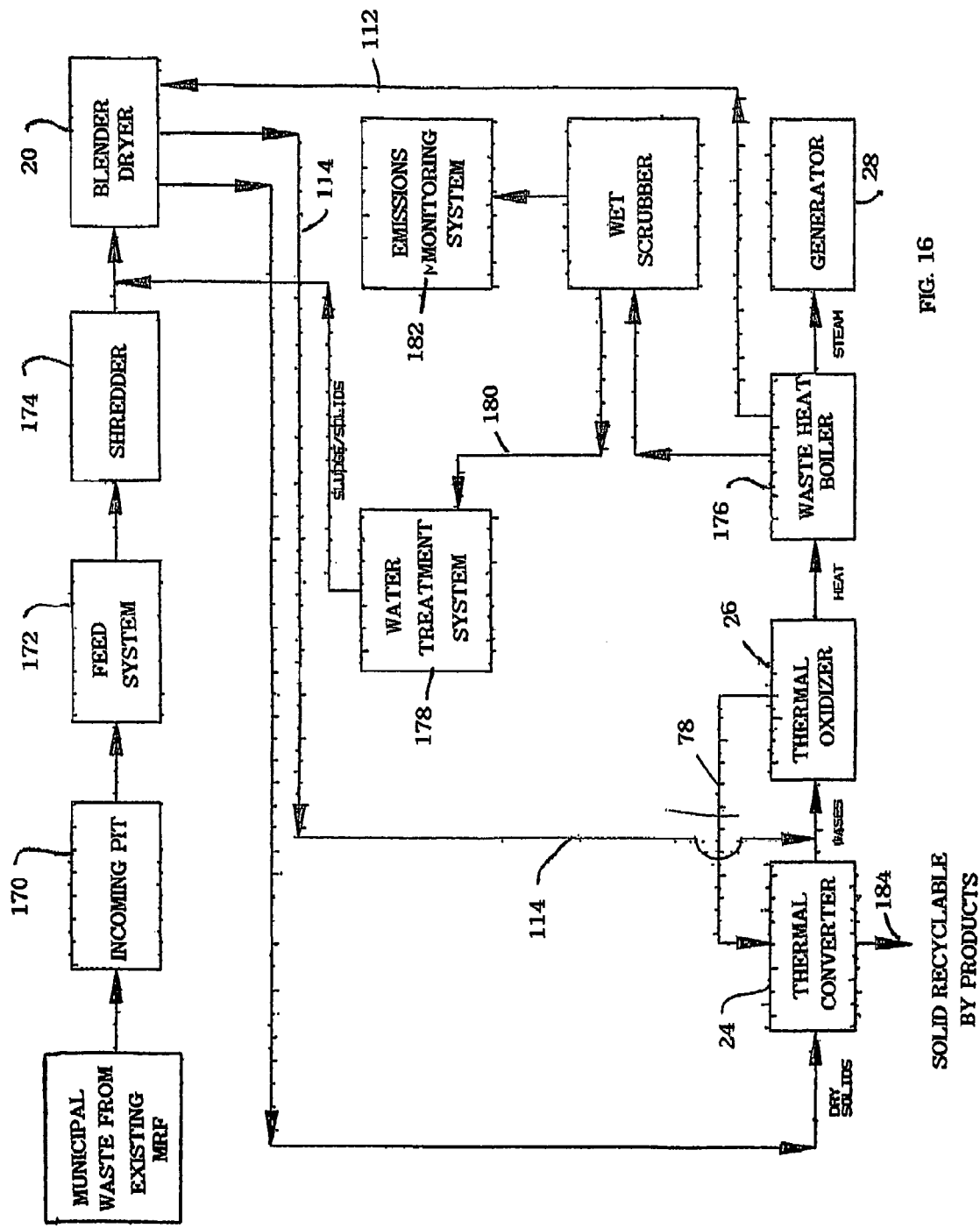
FIG. 16 is a block diagram illustrating the operation of the apparatus of the invention.

By way of summary, during the operational cycle, as illustrated in FIG. 16, the municipal waste to be treated is deposited in an incoming pit 170. From there the waste is transferred by means of a feed system 172 to a conventional shredder 174 which shreds the waste prior to its introduction into the previously identified dryer 20. From the dryer, the dried waste is introduced into the thermal converter 24 via the previously discussed feed means 22. Heated gases generated in the thermal converter are transferred to the thermal oxidizer 26 in the manner previously discussed. As shown in FIG. 16, a portion of the heated gases contained within the thermal oxidizer is returned to the thermal converter via conduit 78. Another portion of the heated gases within the thermal oxidizer is transferred to the waste-heat boiler which forms a part of the previously identified steam generator 28. As depicted in FIG. 16, the heat from the waste-heat boiler is transferred to the blender-dryer by conduit 112 to accelerate the drying process. In turn, the excess gases from the blender-dryer are returned to the thermal oxidizer via conduit 114. A portion of the excess heated gases within the waste-heat boiler 176 are transferred to the wet scrubber and, in the manner previously described, fluids from the wet scrubber are transferred to the water treatment system 178 via a conduit 180. Similarly, gaseous emissions from the wet scrubber are transferred to an admissions monitoring system 182 to ensure that harmful emissions are not emitted into the atmosphere. As indicated by the arrow 184, solid recyclable byproducts are recovered from the thermal converter 24 for appropriate recycling.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

We claim:

1. An apparatus for treating waste material comprising:
   a thermal reactor having an inner chamber that carries a waste stream, and an outer chamber that provides heat to the inner chamber to sustain pyrolysis, wherein the inner chamber is gaseously sealed from the outer chamber in the thermal reactor;
   a first conveyor disposed within the inner chamber that transports the waste stream through the inner chamber, and includes a first screw section;
   a thermal oxidizer that burns gases derived from the inner chamber, and produces exhaust gases that are vented to the outer chamber of the thermal reactor in a manner that heats the waste stream in the inner chamber; and
   wherein the thermal oxidizer further comprises first and second sub-chambers divided by a baffle that controls the flow of gases between the first and second sub-chambers, and wherein a pressure senor is operably associated with the baffle that senses a pressure differential between the first and second sub-chambers.

2. The apparatus of claim 1, further comprising a second conveyor mounted within the inner chamber in a side-by-side relationship with the first conveyor.

3. The apparatus of claim 1, further comprising a feed hopper coupled to the thermal reactor, the hopper controllably feeding the waste stream to the inner chamber of the thermal reactor.

4. The apparatus of claim 3, further comprising a waste conveyor that transports the waste stream to the hopper.

5. The apparatus of claim 3, further comprising a feed screw that transports the waste stream from the hopper.

6. The apparatus of claim 1, further comprising an atomizer upstream of the thermal reactor that at least partially atomizes at least some of the waste stream.

7. The apparatus of claim 1, further comprising a dryer upstream of the thermal reactor that dries at least some of the waste stream.

8. The apparatus of claim 2, wherein the inner chamber has a first sub-chamber disposed about the first conveyor, and a second sub-chamber disposed about the second conveyor.

9. The apparatus of claim 1, further comprising a steam generator that generates steam using at least some of the exhaust gases.

10. The apparatus of claim 9, further comprising a turbine that generates power from the steam.

* * * * *